(12) United States Patent
Kumahashi

(10) Patent No.: US 11,496,636 B2
(45) Date of Patent: Nov. 8, 2022

(54) SYSTEM AND METHOD FOR CHARACTER RECOGNITION PROCESSING

(71) Applicant: CANON KABUSHIKI KAISHA, Tokyo (JP)

(72) Inventor: Shu Kumahashi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/465,432

(22) Filed: Sep. 2, 2021

(65) Prior Publication Data

US 2022/0086289 A1 Mar. 17, 2022

(30) Foreign Application Priority Data

Sep. 14, 2020 (JP) .............................. JP2020-153844

(51) Int. Cl.
*H04N 1/00* (2006.01)
*G06K 9/20* (2006.01)
*G06V 10/22* (2022.01)
*G06V 30/10* (2022.01)

(52) U.S. Cl.
CPC ......... *H04N 1/00331* (2013.01); *G06V 10/22* (2022.01); *H04N 1/0044* (2013.01); *H04N 1/00737* (2013.01); *G06V 30/10* (2022.01)

(58) Field of Classification Search
None
See application file for complete search history.

(56) References Cited

U.S. PATENT DOCUMENTS

| | | | | |
|---|---|---|---|---|
| 2018/0357023 A1* | 12/2018 | Mori | ................... | G06V 30/245 |
| 2020/0311980 A1* | 10/2020 | Shinohara | ............ | G06V 10/768 |
| 2021/0056336 A1* | 2/2021 | Ikeda | ................... | G06K 9/6256 |
| 2021/0075919 A1* | 3/2021 | Okuda | ................ | G06V 30/414 |
| 2021/0303841 A1* | 9/2021 | Yoneda | ............. | G06V 30/1444 |

FOREIGN PATENT DOCUMENTS

JP 2019124981 A 7/2019

* cited by examiner

*Primary Examiner* — Andrew H Lam
(74) *Attorney, Agent, or Firm* — Canon U.S.A., Inc., IP Division

(57) ABSTRACT

An image processing system includes an information processing apparatus and an image processing apparatus. The image processing apparatus generates a plurality of pieces of image data by scanning a plurality of documents, associates, with image data generated by scanning a handwritten document out of the plurality of pieces of image data, information indicating that the image data is image data generated by scanning a handwritten document, and transmits, to the information processing apparatus, the plurality of pieces of image data and the information. The information processing apparatus receives the information and the plurality of pieces of image data; and executes character recognition processing on first image data with which the information is not associated, and obtains character information based on the first image data, wherein character information based on second image data with which the information is associated is obtained by executing processing different from the character recognition processing.

18 Claims, 10 Drawing Sheets

SYSTEM AND METHOD FOR CHARACTER RECOGNITION PROCESSING

BACKGROUND

Field

The present disclosure relates to an image processing system, an image processing method, and a storage medium.

Description of the Related Art

As discussed in Japanese Patent Application Laid-Open No. 2019-124981, there is a service for registering an image file generated by scanning documents, such as receipts, by an image processing apparatus in an external expense processing system.

The types of documents, such as receipts, are generally divided into two types, i.e., a partially or entirely handwritten document and a mechanically printed (typed) document. In a mechanically printed document, a character string can be extracted by character recognition processing (optical character recognition (OCR)). However, the recognition accuracy of handwritten characters scanned by OCR is lower than that of printed characters scanned by OCR, and recognition errors in the recognition of handwritten characters are more likely to occur than in the recognition of printed characters. Therefore, it may be desirable to execute character recognition processing on a handwritten document and character recognition processing on a printed document separately.

SUMMARY

In a case where a handwritten document is registered in an expense processing system, an operator can register a character string by visually checking the character string, instead of executing OCR.

For example, if a handwritten document or a printed document is designated in each scanning process, the scanning process needs to be executed a plurality of times in the case of registering image data generated by scanning a plurality of documents including both a handwritten document and a printed document, in the expense processing system, which requires an operator to perform troublesome handling of documents.

The present disclosure is directed to eliminating the troublesome operation in handling documents while designating a handwritten document or a printed document.

An image processing system includes an information processing apparatus and an image processing apparatus. The image processing apparatus includes a generation unit configured to generate a plurality of pieces of image data by scanning a plurality of documents, a controlling unit configured to associate, with image data generated by scanning a handwritten document out of the plurality of pieces of image data, information indicating that the image data is image data generated by scanning a handwritten document, and a transmission unit configured to transmit, to the information processing apparatus, the plurality of pieces of image data generated by the generation unit and the information. The information processing apparatus includes a reception unit configured to receive the information and the plurality of pieces of image data transmitted by the transmission unit, and a character recognition unit configured to execute character recognition processing on first image data with which the information is not associated, out of the plurality of pieces of image data received by the reception unit and to obtain character information based on the first image data by executing the character recognition processing, wherein character information based on second image data with which the information is associated, out of the plurality of pieces of image data is received by the reception unit is obtained by executing processing different from the character recognition processing.

Further features of the present disclosure will become apparent from the following description of exemplary embodiments with reference to the attached drawings.

BRIEF DESCRIPTION I/F THE DRAWINGS

DESCRIPTION I/F THE EMBODIMENTS

Exemplary embodiments of the present disclosure will be described in detail below with reference to the drawings. The following exemplary embodiments are not meant to limit the scope of the present disclosure as encompassed by the claims. Further, not all combinations of features described in the exemplary embodiments are essential for solving means of the present disclosure.

A first exemplary embodiment will be described below.

Figure 1:
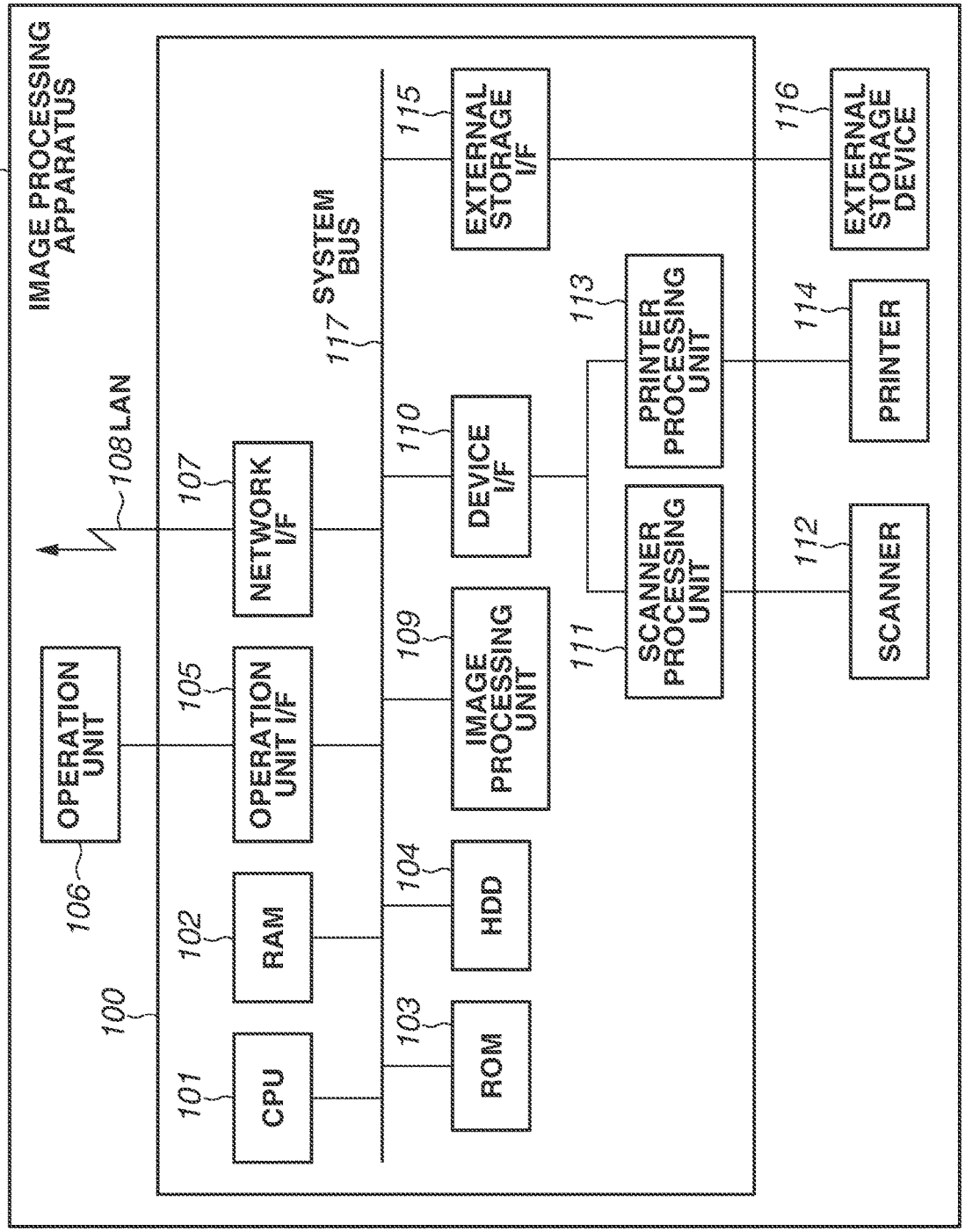
FIG. 1 is a block diagram illustrating a hardware configuration of an image processing apparatus according to a first exemplary embodiment.

FIG. 1 is a block diagram illustrating a hardware configuration of an image processing apparatus according to the first exemplary embodiment. In the present exemplary embodiment, as illustrated in FIG. 1, an image processing apparatus 1 is implemented as, for example, a multi-function peripheral (MFP) in which a plurality of functions, such as a scanning function and a printing function, are integrated. The image processing apparatus 1 includes a controller unit 100 that controls the overall operation of the image processing apparatus 1, an operation unit 106, a scanner 112, and a printer 114. The operation unit 106 includes a numeric keypad and various hardware keys for receiving an input of an instruction, such as a job execution instruction, from a user, and also includes a display panel that displays information for the user, such as apparatus information and job progress information, or setting screens for functions that can be executed by the image processing apparatus 1. The scanner 112 is an image input device that optically scans an image on a set document. The printer 114 is an image output device that prints an image on a recording medium, such as a print sheet, based on image data.

The operation unit 106 is connected to an operation unit interface (I/F) 105 included in the controller unit 100. The scanner 112 and the printer 114 are connected to a scanner processing unit 111 and a printer processing unit 113, respectively, which are included in the controller unit 100. With this configuration, the operation unit 106, the scanner 112, and the printer 114 each operates under control of the controller unit 100.

An external storage device 116, such as a universal serial bus (USB) memory medium, can be connected to the image processing apparatus 1, as needed. In this case, the external storage device 116 is connected to the controller unit 100 via an external storage I/F 115 and operates under control of the controller unit 100.

The controller unit 100 also includes a central processing unit (CPU) 101 that controls the blocks of the controller unit 100 in an integrated manner. The CPU 101 is connected to each of a random access memory (RAM) 102, a read-only memory (ROM) 103, a hardware disk drive (HDD) 104, the operation unit I/F 105, and a network I/F 107 via a system bus 117. The CPU 101 is also connected to an image processing unit 109, a device I/F 110, and the external storage I/F 115. The RAM 102 is a general-purpose RAM for providing a work area for the CPU 101. The RAM 102 is also used as a memory for temporarily storing parameters, setting values, and the like, and as an image memory for storing image data in predetermined units such as units of pages. The ROM 103 is a general-purpose ROM and is used as, for example, a boot ROM for storing a system boot program. The HDD 104 stores system software programs, history data, tables, and the like. The functions of the image processing apparatus 1 are implemented such that, for example, the CPU 101 reads out programs stored in the ROM 103 into the RAM 102 and executes the programs.

The operation unit I/F 105 is an interface for inputting and outputting information to and from the operation unit 106. The operation unit I/F 105 outputs display data to the operation unit 106 in response to an instruction from the CPU 101, and transmits information input by the user via the operation unit 106 to the CPU 101.

The network I/F 107 is connected to a local area network (LAN) 108 serving as a wired or wireless medium, and enables input and output of information between the image processing apparatus 1 and each apparatus on the LAN 108. The network I/F 107 includes a configuration compatible with the LAN 108, and may include, for example, a configuration capable of performing near-field communication with a wireless distance of about several tens of centimeters (cm). In this case, the network I/F 107 communicates with a mobile wireless terminal.

The image processing unit 109 executes general image processing. For example, the image processing unit 109 executes processing, such as enlargement/reduction, rotation, or conversion, on image data obtained from an external apparatus via the LAN 108. The image processing unit 109 executes processing for converting a page-description language (PDL) code received via the LAN 108 into a bitmap image. In the case of outputting image data by the printer 114 via the printer processing unit 113, the image processing unit 109 executes processing for converting image data stored in a compressed or encoded format in the RAM 102 into a format that can be processed by the printer processing unit 113.

The device I/F 110 is connected to the scanner 112 and the printer 114 via the scanner processing unit 111 and the printer processing unit 113, respectively, and performs synchronous/asynchronous conversion on image data, and transmission of setting values, adjustment values, and the like to the scanner 112 and the printer 114. Further, the device I/F 110 transmits state information in the scanner 112 and the printer 114 to the CPU 101. The state information includes error information indicating, for example, a jam that has occurred in the scanner 112 or the printer 114.

The scanner processing unit 111 performs various processes corresponding to the scanning function, such as correction, processing, image area separation, scaling, and binarization processing, on scanned data that is scanned and output by the scanner 112. The scanner 112 includes an automatic continuous document feeding device and a pressing plate reading device, which are not illustrated, and can execute processing such as scanning a document placed on a glass document platform, and scanning both sides of a plurality of documents. The scanner 112 is provided with sensors for detecting opening/closing of a feeding device cover (not illustrated), opening/closing of a document cover (not illustrated), the presence/absence of a document, a document size, and the like. Detection signals from the sensors and state information from the scanner 112 are transmitted to the CPU 101 via the scanner processing unit 111 and the device I/F 110, and the CPU 101 recognizes the state of the scanner 112, such as error occurrence or error cancellation in the scanner 112.

The printer processing unit 113 performs various processes corresponding to the printing function, such as output correction, resolution conversion, and adjustment of image print positions corresponding to the output characteristics of the printer 114, on the image data to be printed out. The printer 114 includes one or more sheet feed cassettes (not illustrated) for storing print sheets, one or more toner trays (not illustrated) for storing toner, and a sheet feed unit (not illustrated) capable of feeding one sheet at a time from the sheet feed cassette. The printer 114 also includes a marking unit (not illustrated) for applying toner onto the fed paper, and a fixing unit (not illustrated) for fixing the toner applied by the marking unit by heat and pressure. The printer 114 is provided with sensors for detecting the opening/closing status and the remaining amount of paper in each sheet feed cassette, the opening/closing status of the toner tray, opening/closing of a sheet feed unit cover (not illustrated), the presence/absence of toner, the position of paper that is being fed, and the like. Detection signals from the sensors and state information from the printer 114 are transmitted to the CPU 101 via the printer processing unit 113 and the device I/F 110, and the CPU 101 recognizes the state of the printer 114, such as error occurrence or error cancellation in the printer 114.

When the external storage I/F 115 is connected to the external storage device 116, reading of data stored in the external storage I/F 115 or writing of data to the external storage device 116 is executed in response to an instruction from the CPU 101.

Figure 2:
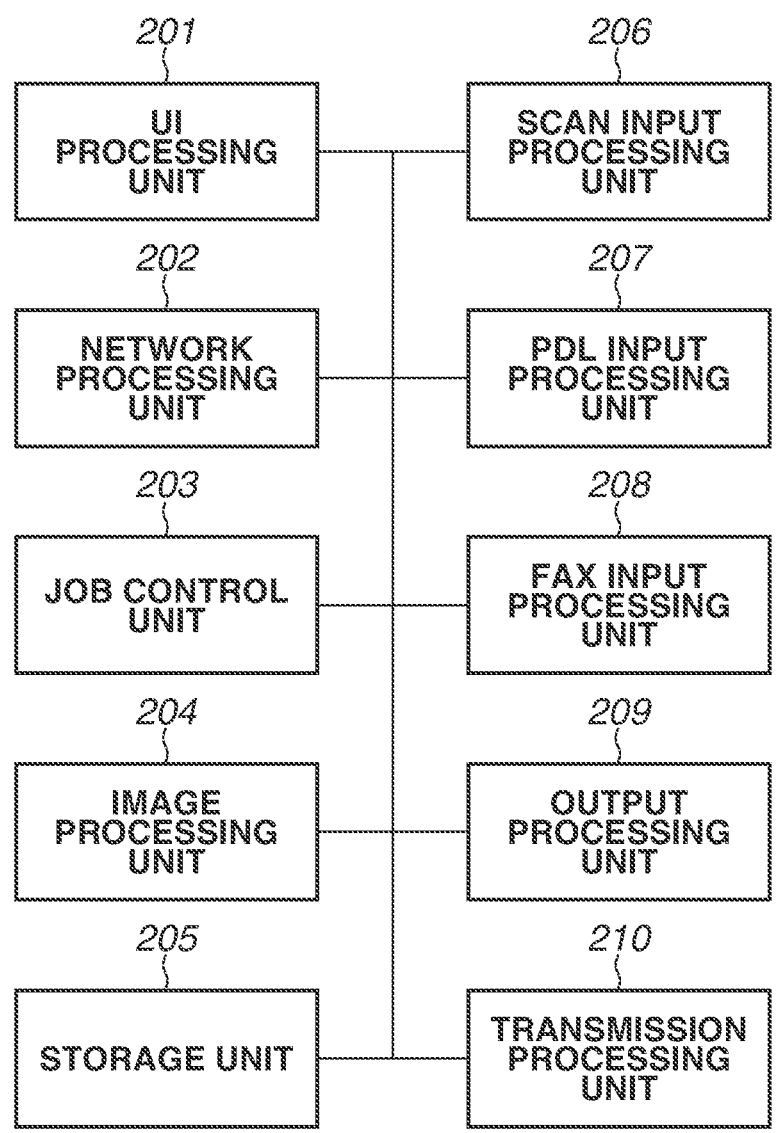
FIG. 2 is a block diagram illustrating a configuration of software modules of the image processing apparatus according to the first exemplary embodiment.

FIG. 2 is a block diagram illustrating a configuration of each software module of the image processing apparatus 1. Each module illustrated in FIG. 2 is implemented such that the CPU 101 executes programs.

A user interface (UI) processing unit 201 performs processing related to the operation unit I/F 105 and the operation unit 106. The UI processing unit 201 notifies, as needed, other modules of an operation performed by the user on the operation unit 106, and displays a screen on the operation unit 106 in response to an instruction from the another module. Further, the UI processing unit 201 performs processing such as editing of drawing data to be displayed on the operation unit 106.

A network processing unit 202 executes communication processing with an apparatus on the LAN 108 via the network I/F 107. Upon receiving a control command or data from the apparatus on the LAN 108, the network processing unit 202 notifies other modules of the information. Further, the network processing unit 202 transmits the control command or data to the apparatus on the LAN 108 in response to an instruction from another module.

A job control unit 203 controls other modules to integrally control execution of jobs, such as copying, printing, and facsimile (FAX) transmission, which are generated in the image processing apparatus 1, in an integrated manner. When a job is input from the UI processing unit 201 or the network processing unit 202, the job control unit 203 determines the type of the job and instructs an input processing unit suitable for the type of the job to execute processing for generating an image to be printed. For example, when a copying job is input, the job control unit 203 instructs a scan input processing unit 206 to execute the job, and when a PDL job is input, the job control unit 203 instructs a PDL input processing unit 207 to execute the job. When each input processing unit generates an image for each page and stores the generated image in a storage unit 205, the input processing unit sends a notification to the job control unit 203. Upon receiving the notification, the job control unit 203 instructs an output processing unit 209 to execute processing for printing the image on a recording medium. The series of control operations are repeated a number of times corresponding to the number of pages, thereby implementing image printing processing.

An image processing unit 204 performs processing related to the image processing unit 109. The image processing unit 204 performs image processing by software or image processing by hardware using the image processing unit 109 in response to an instruction from each input processing unit or the output processing unit 209.

The storage unit 205 performs reading of data from the RAM 102 or the HDD 104, and writing of data to the RAM 102 or the HDD 104. The storage unit 205 also performs setting of a job and storage of image data in response to an instruction from other modules.

The scan input processing unit 206 controls the scanner processing unit 111 and the scanner 112 to execute scanning processing on a document placed on the scanner 112 in response to an instruction from the job control unit 203. The scan input processing unit 206 controls the scanner processing unit 111 to execute image processing on the scanned image data. Further, the scan input processing unit 206 acquires state information about the scanner processing unit 111 and the scanner 112, and notifies the job control unit 203 of the acquired state information. Upon receiving an interrupt instruction to be described below from the job control unit 203, the scan input processing unit 206 interrupts the document scanning processing and image generation processing.

The PDL input processing unit 207 performs processing for analyzing PDL data received via the network processing unit 202 and converting the PDL data into a bitmap image for each page in response to an instruction from the job control unit 203. The converted bitmap image is stored in a storage area by the storage unit 205. Upon receiving an interrupt instruction to be described below from the job control unit 203, the PDL input processing unit 207 interrupts the PDL analysis processing and image generate processing.

A FAX input processing unit 208 performs processing for converting data received via the network processing unit 202 into a binary image for each page in response to an instruction from the job control unit 203. The binary image obtained by the conversion is stored in the storage area by the storage unit 205.

The output processing unit 209 controls the image processing unit 204, the printer processing unit 113, and the printer 114 to perform appropriate image processing on image data generated by each input processing unit and perform processing for printing image data on a recording medium, in response to an instruction from the job control unit 203. Further, the output processing unit 209 acquires state information about the printer processing unit 113 and the printer 114, and notifies the job control unit 203 of the acquired state information. During a period in which the output processing unit 209 is executing printing processing based on a certain job, the output processing unit 209 does not execute printing processing based on another job. However, only in a case where the output processing unit 209 receives a priority update notification to be described below from the job control unit 203, the output processing unit 209 may interrupt processing on the job for which printing is in progress and may start processing for the other job.

A transmission processing unit 210 controls the image processing unit 204 and the network processing unit 202 to transmit an image to each apparatus on the LAN 108, in response to an instruction from the job control unit 203.

Figure 3:
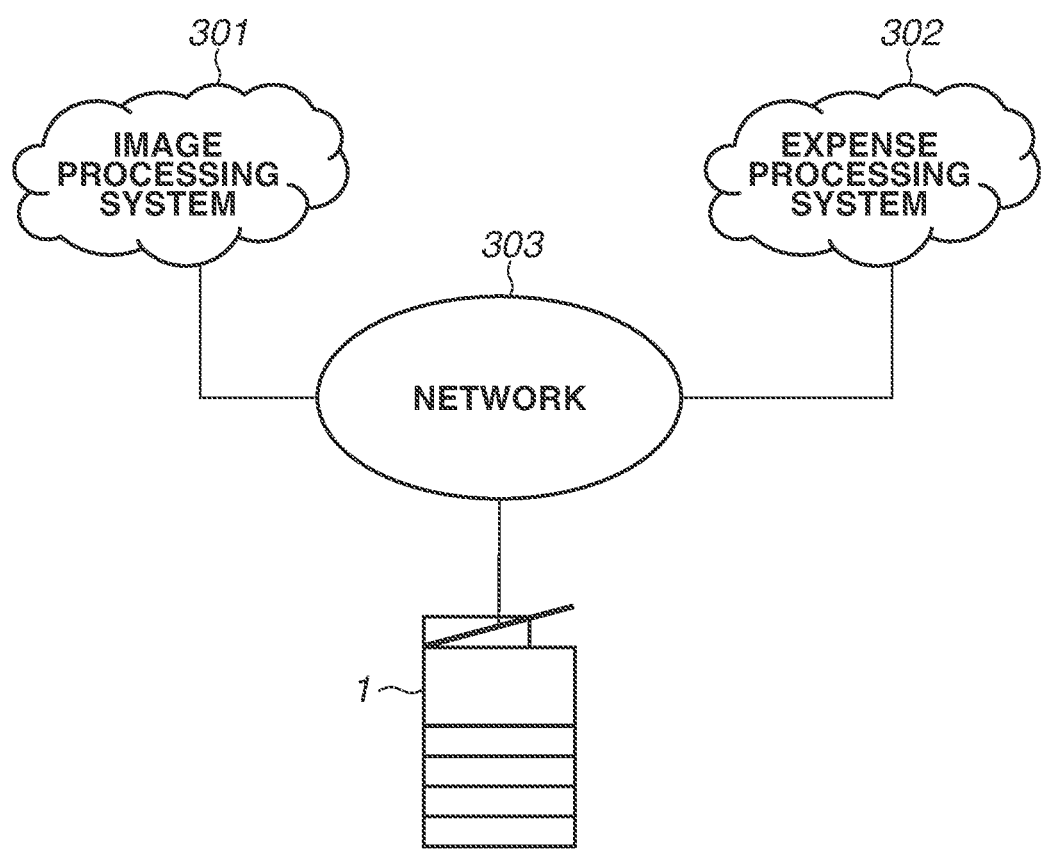
FIG. 3 illustrates an overall configuration of a cooperative system.

FIG. 3 illustrates an overall configuration of a cooperative system according to the present exemplary embodiment. The image processing apparatus 1 is connected to each of an image processing system 301 and an expense processing system 302 via a network 303. The image processing apparatus 1 requests the image processing system 301 to execute image data division and handwriting determination to be described below. Further, the image processing apparatus 1 requests the expense processing system 302 to perform expense registration processing using an image to be described below. In this case, the expense processing system 302 includes a server serving as an information processing apparatus. The image processing apparatus 1 is an image processing apparatus communicable with an information processing apparatus that executes character recognition processing on received image data and registers a character string acquired in the character recognition processing.

When image data obtained by scanning a mechanically printed (typed) document is registered, the expense processing system 302 automatically acquires a character string, such as an amount of money, by optical character recognition (OCR) (character recognition processing), and registers the character string as additional information. The processing on a handwritten document varies depending on the expense processing system 302 to be used. For example, an operator that operates the expense processing system 302 visually checks an image based on transmitted image data, and the operator manually inputs a character string and registers the input character string in the expense processing system 302. Specifically, the server of the expense processing system 302 can register the input character string by executing processing different from character recognition processing on the received image data, together with information indicating that the received image data is not image data generated by scanning a handwritten document.

Figure 4:
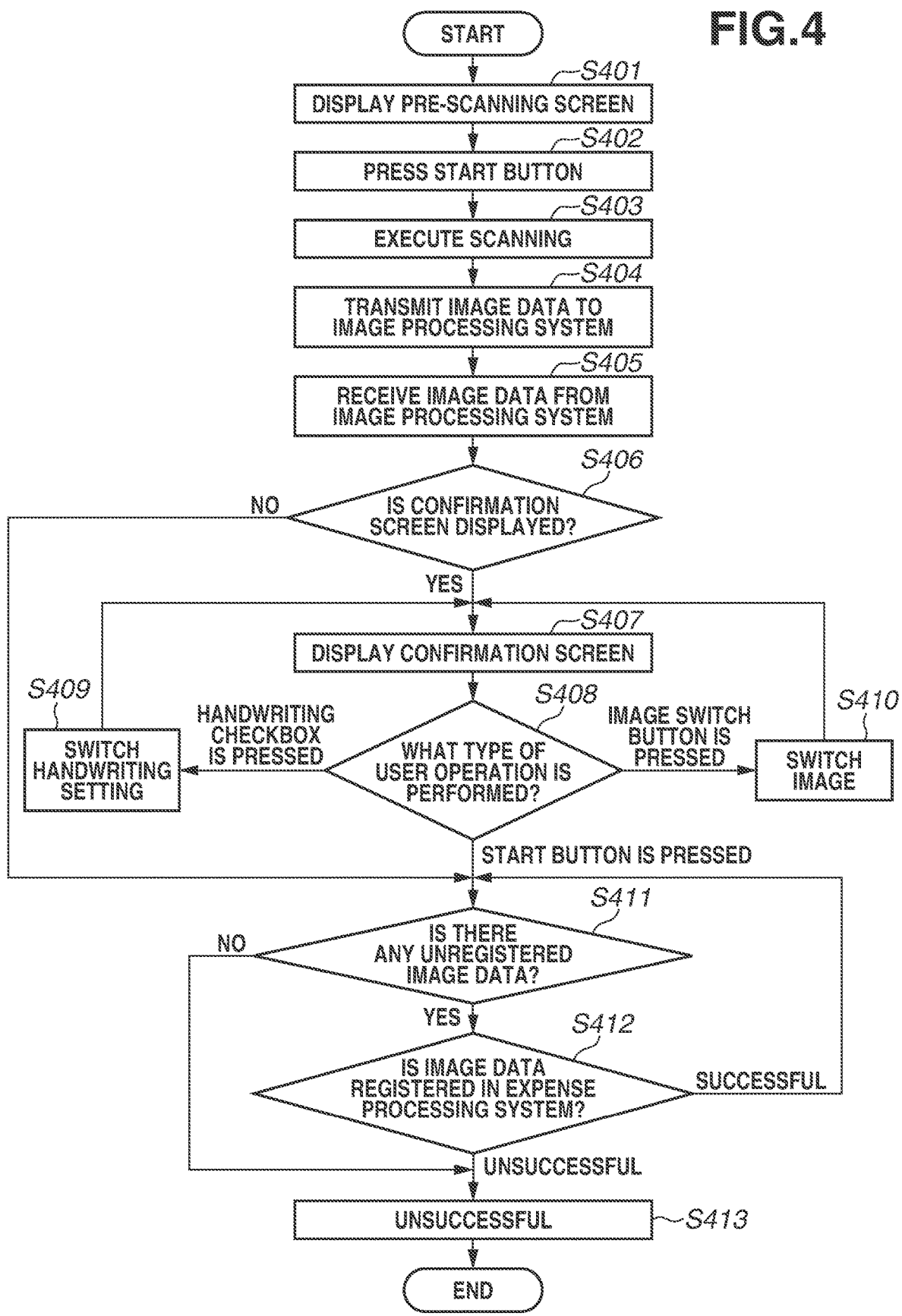
FIG. 4 is a flowchart of voucher expense registration processing to be executed by the image processing apparatus according to the first exemplary embodiment.

FIG. 4 is a flowchart for voucher expense registration processing to be executed by the image processing apparatus 1. The processing in the flowchart is implemented such that, for example, the CPU 101 reads out programs stored in the HDD 104 into the RAM 102 and executes the programs.

Figure 5:
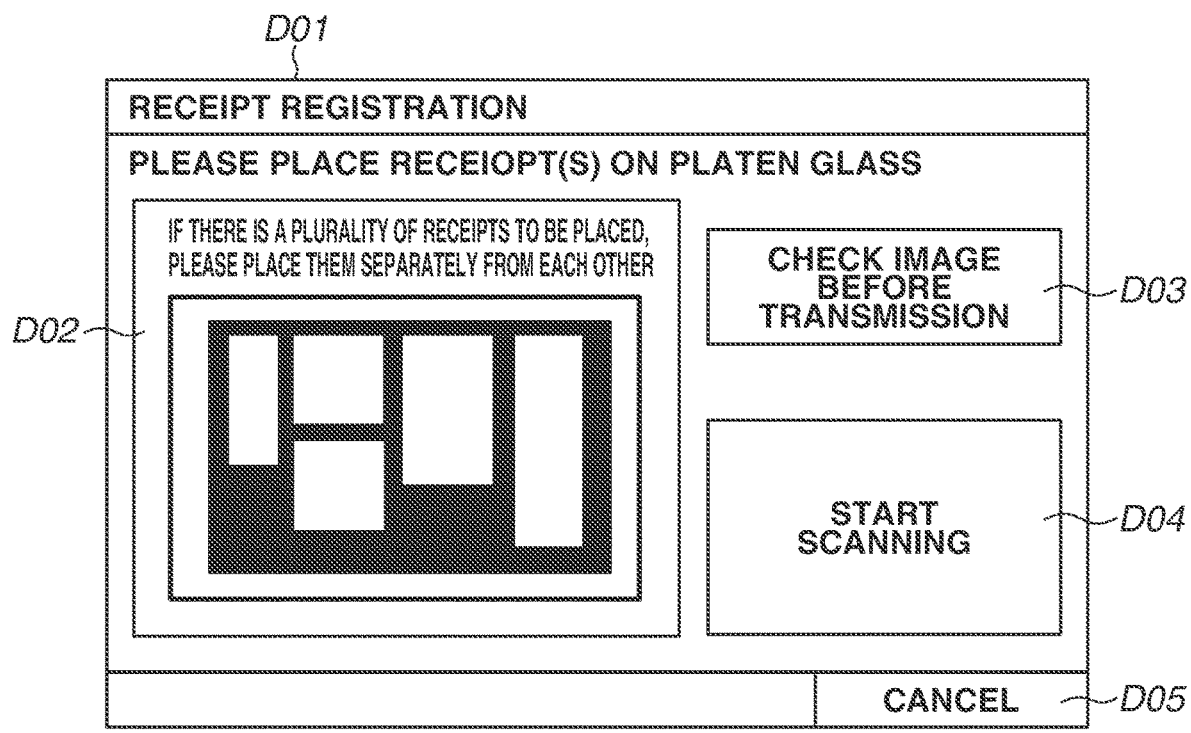
FIG. 5 illustrates a voucher pre-scanning screen of the image processing apparatus according to the first and second exemplary embodiments.

In step S401, the CPU 101 displays a pre-scanning screen D illustrated in FIG. 5 on the operation unit 106. D02 indicates how to place a plurality of documents (vouchers) on the scanner 112 to scan the documents at a time. D03 represents a setting button for previewing and checking the image before transmission. When this button is selected, the processing in step S407 to be described below is executed. D04 represents a start button for starting scanning processing. A cancel button D05 is a button for cancelling registration processing. When this button is pressed, the processing that is being executed is interrupted and the screen shifts to a home screen (not illustrated).

In step S402, the CPU 101 accepts pressing of the start button D04 by the user.

Figure 6:
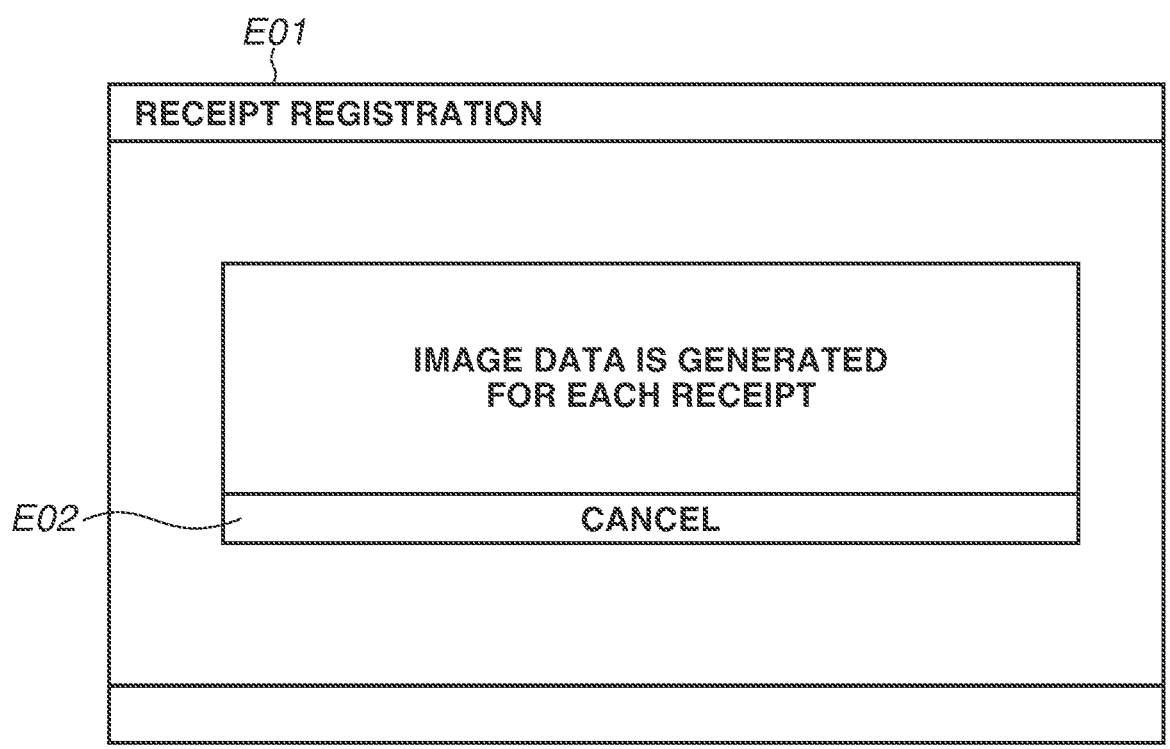
FIG. 6 illustrates a voucher scan-in-progress screen of the image processing apparatus according to the first and second exemplary embodiments.

In step S403, the CPU 101 executes scanning processing. At this time, a scan-in-progress screen E01 illustrated in FIG. 6 is displayed on the operation unit 106. This screen is continuously displayed until the processing of steps S404 and S405 to be described below ends. A cancel button E02 is similar to the cancel button D05.

In this step, one piece of image data is generated by scanning a plurality of documents (e.g., receipts), which are placed on a platen glass (not illustrated).

In step S404, the CPU 101 transmits the scanned image data to the image processing system 301 to divide the image data into individual images of the documents. If the image data cannot be transmitted due to a communication error or the like, an error screen (not illustrated) is displayed to cancel the registration processing. The image processing system 301 executes a microchip function for dividing the image data received from the image processing apparatus 1 into individual images of the documents, thereby generating a plurality of pieces of image data. Further, the image processing system 301 determines whether each of the plurality of pieces of generated image data is image data generated by scanning a handwritten document. In this case, the division of image data and the determination as to whether the image data is image data generated by scanning a handwritten document may be executed by the image processing apparatus 1.

In step S405, the CPU 101 receives the plurality of pieces of image data from the image processing system 301. At this time, information indicating whether each of the plurality of pieces of image data is generated by scanning a handwritten image is also received. If the information cannot be received due to a communication error or the like, an error screen (not illustrated) is displayed to cancel the registration processing.

In step S406, it is determined whether a setting for displaying a confirmation screen is made. If the setting for displaying the confirmation screen is made (YES in step S406), the processing proceeds to step S407. If the setting for not displaying the confirmation screen is made (NO in step S406), the processing proceeds to step S411.

Figure 7:
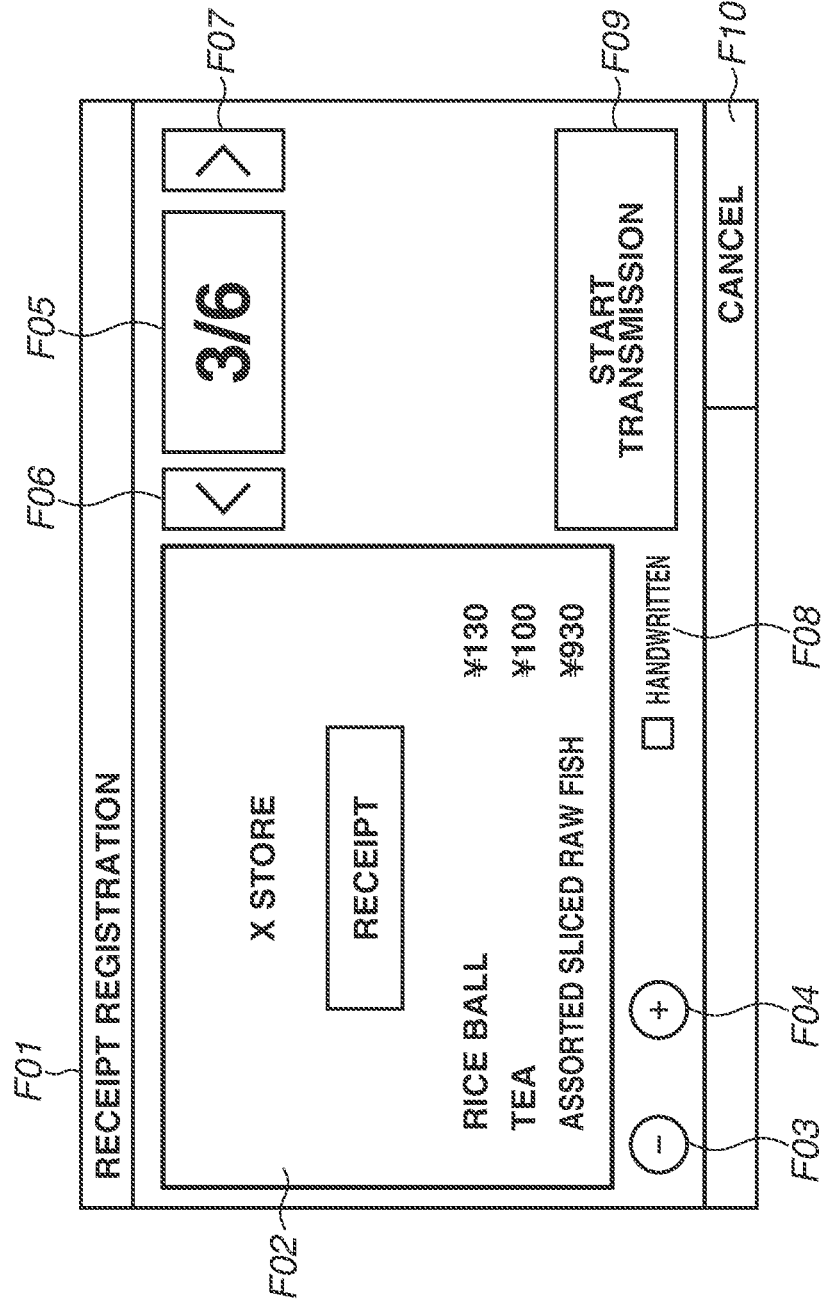
FIG. 7 illustrates a setting confirmation screen displayed before voucher registration by the image processing apparatus according to the first and second exemplary embodiments.

In step S407, the CPU 101 displays a confirmation screen F01 illustrated in FIG. 7 for setting options for image checking and registration. F02 represents an image preview field. F03 represents a reduction button for instructing to display a reduced image, and F04 represents an enlargement button for instructing to display an enlarged image. F05 represents a number display indicating which page of the plurality of pieces of image data is previewed. FIG. 7 illustrates that the third page of six pages of image data is previewed. F06 and F07 represent image switch buttons for switching images to be previewed. F08 represents a checkbox indicating a handwriting setting (whether it is handwritten) for the image that is being previewed. In the state illustrated in FIG. 7, the checkbox is not checked because the image that is not handwritten is previewed. If a handwritten image is previewed, the checkbox is checked. Further, the user can manually check the checkbox by pressing the checkbox F08. This is useful when the image processing system 301 cannot detect that the document is handwritten, or when the document that is not handwritten is erroneously determined to be a handwritten document. F09 represents a start button for starting to register image data in the expense processing system 302. A cancel button F10 is similar to the cancel button D05. Thus, when the document image that is determined to include handwritten characters by the image processing system 301 is previewed, the checkbox indicating handwritten characters can be checked. Accordingly, when the image data generated by scanning the documents is registered in the expense processing system 302, whether to request for OCR processing or visual check processing can be switched. In such a manner, based on the result of determination as to whether the image data is generated by scanning a handwritten document, information indicating whether the image data is image data generated by scanning a handwritten document can be set for each image data.

In step S408, the CPU 101 causes the processing to branch depending on a user operation. If the checkbox F08 is pressed, the processing proceeds to step S409. If the image switch button F06 or F07 is pressed, the processing proceeds to step S410. If the start button F09 is pressed, the processing proceeds to step S411.

In step S409, the CPU 101 switches the handwriting setting for the image that is being previewed. After that, the processing returns to step S407 to update the display of the checkbox F08.

In step S410, the CPU 101 switches the image to be previewed. When the image switch button F06 is pressed, the image is switched to the previous image, and when the image switch button F07 is pressed, the image is switched to the subsequent image. After that, the processing returns to step S407 to update the display of the image preview field F02.

Figure 8:
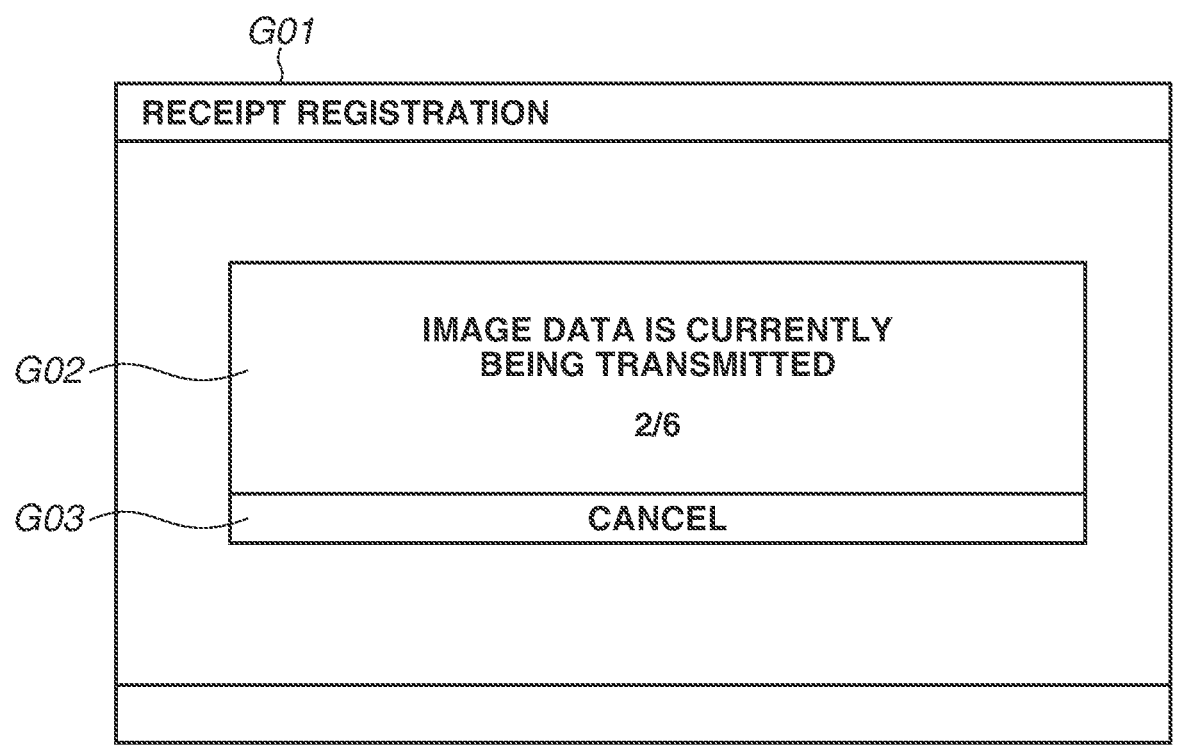
FIG. 8 illustrates a voucher registration-in-progress screen of the image processing apparatus according to the first and second exemplary embodiments.

In step S411, the CPU 101 checks whether there is any unregistered image data in the plurality of pieces of generated image data. If there is unregistered image data (YES in step S411), the processing proceeds to step S412. If there is no unregistered image data (NO in step S411), the processing proceeds to step S413. At this time, a transmission-in-progress screen G1 illustrated in FIG. 8 is displayed on the operation unit 106. G02 represents the number of the image data, among the plurality of pieces of image data, that is currently being transmitted. If the processing of step S412 to be described below is normally completed, the number is incremented. A cancel button G03 is similar to the cancel button D05. This screen is continuously displayed until the processing proceeds to step S413 to be described below.

In step S412, the CPU 101 transmits the image data to the expense processing system 302 and requests the expense processing system 302 to register the image data as expense data. At this time, whether to register the image data as a handwritten image or as a mechanically printed image (typed document) is switched depending on handwriting setting information. Specifically, the image processing apparatus 1 transmits, to the server of the expense processing system 302, the image data as well as the information indicating whether the image data to be transmitted is image data generated by scanning a handwritten document.

Whether to transmit information for requesting OCR processing or information for requesting visual check processing, as well as the image data to be registered, may be switched.

When the image data is registered as a mechanically printed image, the expense processing system 302 scans an amount of money or the like by OCR. If the transmission is successful ("SUCCESSFUL" in step S412), the processing returns to step S411 to transmit the rest of the pieces of image data. If the transmission is unsuccessful ("UNSUCCESSFUL" in step S412), the transmission processing is cancelled regardless of the presence or absence of the other pieces of image data, and the processing proceeds to step S413.

Figure 9:
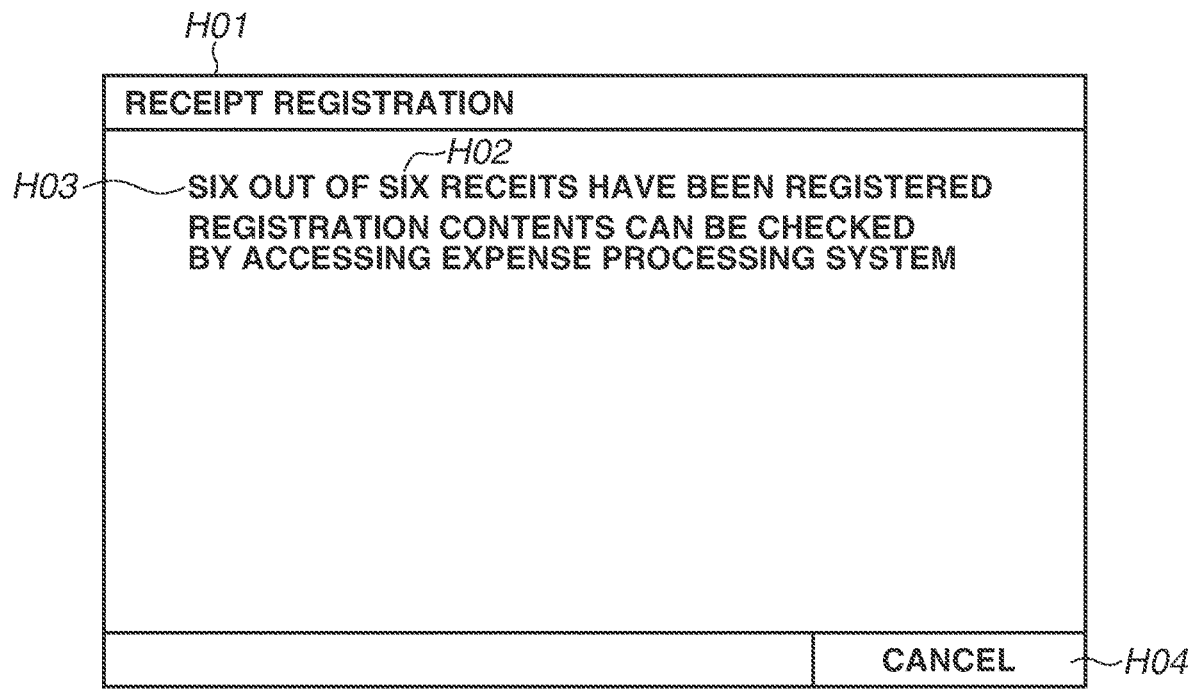
FIG. 9 illustrates a result confirmation screen displayed after voucher registration by the image processing apparatus according to the first and second exemplary embodiments.

In step S413, the CPU 101 displays a transmission result screen H01 indicating a result of the transmission to the expense processing system 302 as illustrated in FIG. 9. A portion H02 represents the total number of receipt images. A portion H03 represents the number of receipt images that have successfully been transmitted to the expense processing system 302. An end button H04 is a button for terminating the register processing. In addition, a list (not illustrated) of registered contents (e.g., a date, an amount of money) may be displayed on the transmission result screen H01.

By the above-described procedure, both of a handwritten document and a mechanically printed document can be registered in the expense processing system 302 from the image processing apparatus 1 in one scanning process.

A second exemplary embodiment will be described.

While the first exemplary embodiment has been described above based on a configuration in which the image processing, including the image division and the handwriting determination, is executed by the image processing system 301, a second exemplary embodiment is described based on a configuration in which the image division and the handwriting determination are executed by the image processing apparatus 1. This configuration may be employed as long as the image processing apparatus 1 has sufficient CPU performance and memory resources.

Descriptions of components that are similar to those of the first exemplary embodiment are omitted in the following description.

Figure 10:
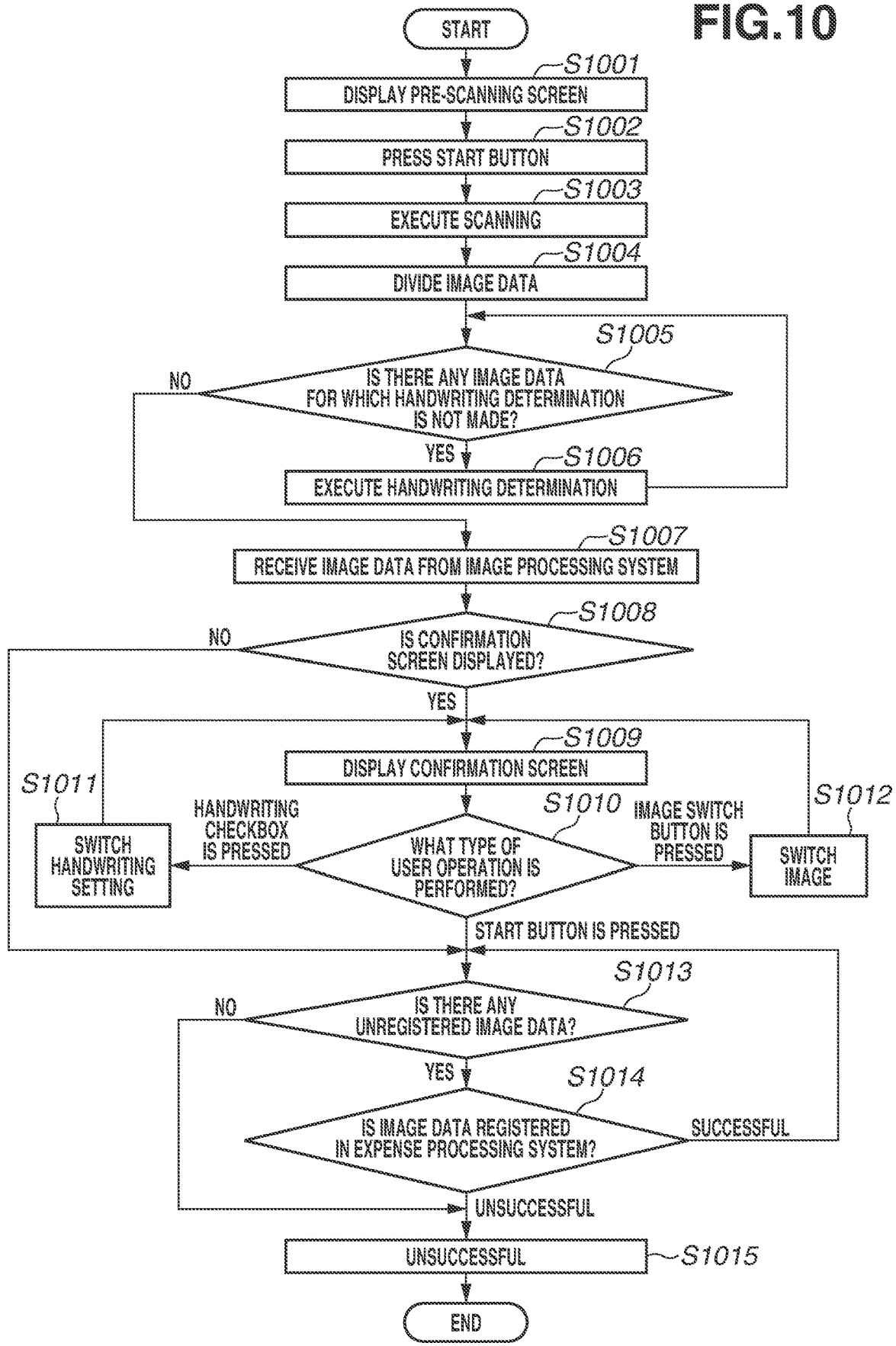
FIG. 10 is a flowchart of voucher expense registration processing to be executed by the image processing apparatus according to the second exemplary embodiment.

FIG. 10 is a flowchart of expense registration processing executed on image data by the image processing apparatus 1 according to the second exemplary embodiment. The processing in the flowchart of FIG. 10 is implemented such that, for example, the CPU 101 reads out programs stored in the HDD 104 into the RAM 102 and executes the programs.

In steps S1001 to S1003, the processing of steps 401 to 403 described above is carried out.

In step S1004, the CPU 101 divides the image data generated by scanning documents into individual images of the documents. If the processing cannot be executed due to depletion of memory resources or the like, an error screen (not illustrated) is displayed to cancel the registration processing.

In step S1005, the CPU 101 checks whether there is any image data for which handwriting determination is not made. If there is image data for which handwriting determination is not made (YES in step S1005), the processing proceeds to step S1006. If there is no image data for which handwriting determination is not made (NO in step S1005), the processing proceeds to step S1007.

In step S1006, the CPU 101 executes handwriting determination on the image data. If it is determined that the document is handwritten, the handwriting setting checkbox F08 is checked on the confirmation screen F01 illustrated in FIG. 7 described above. If it is determined that the document is not handwritten, the handwriting setting checkbox F08 is not checked.

In steps S1007 to S1015, the processing of steps S405 to S413 described above is carried out.

By the above-described procedure, both of a handwritten document and a mechanically printed document can be registered in the expense processing system 302 from the image processing apparatus 1 in one scanning process. Further, since both of the image division and the handwriting determination can be executed by the image processing apparatus 1, the possibility of occurrence of a failure depending on the communication status can be reduced as compared with the first exemplary embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-153844, filed Sep. 4, 2020, which is hereby incorporated by reference herein in its entirety.

What is claimed is:

1. An image processing system comprising:
an information processing apparatus; and
an image processing apparatus, wherein the image processing apparatus includes:
a generation unit configured to generate a plurality of pieces of image data by scanning a plurality of documents;
a controlling unit configured to associate, with image data generated by scanning a handwritten document out of the plurality of pieces of image data, information indicating that the image data is image data generated by scanning a handwritten document; and
a transmission unit configured to transmit, to the information processing apparatus, the plurality of pieces of image data generated by the generation unit and the information
wherein the information processing apparatus includes:
a reception unit configured to receive the information and the plurality of pieces of image data transmitted by the transmission unit; and
a character recognition unit configured to execute character recognition processing on first image data with which the information is not associated, out of the plurality of pieces of image data received by the reception unit and to obtain character information based on the first image data by executing the character recognition processing, and
wherein character information based on second image data with which the information is associated, out of the plurality of pieces of image data received by the reception unit is obtained by executing processing different from the character recognition processing.

2. The image processing system according to claim 1,
wherein the image processing apparatus further includes a display unit,
wherein the display unit displays the plurality of pieces of image data generated by the generation unit and an object on a screen, and
wherein in a case where the object displayed by the display unit is selected by a user, the controlling unit associates the information with image data displayed by the display unit when the object is selected by the user, out of the plurality of pieces of image data.

3. The image processing system according to claim 1,
wherein the image processing apparatus further includes a determination unit configured to determine whether each of the plurality of pieces of image data generated by the generation unit is image data generated by scanning a handwritten document, and
wherein the controlling unit is configured to associate the information with image data determined that image data generated by scanning a handwritten document by the determination unit.

4. The image processing system according to claim 1,
wherein the image processing apparatus further includes a glass document platform, and
wherein the generation unit generates the plurality of pieces of image data by scanning the plurality of documents placed on the glass document platform.

5. The image processing system according to claim 4,
wherein the generation unit generates a piece of image data by scanning the plurality of documents placed on the glass document platform and then generates the plurality of pieces of image data by separating the piece of image data generated by the generation unit.

6. The image processing system according to claim 1,
wherein the information processing apparatus obtains, based on a character string input by executing the processing different from the character recognition processing, the character information based on the second image data.

7. An image processing method comprising:
generating a plurality of pieces of image data by scanning an image on a plurality of documents;
associating information indicating that the image data is image data generated by scanning a handwritten document with the image data generated by scanning a handwritten document out of the plurality of pieces of image data;
transmitting, to an information processing apparatus, the generated plurality of pieces of image data and the information;
receiving the transmitted plurality of pieces of image data and the transmitted information; and
executing character recognition processing on the first image data with which the information is not associated, out of the received plurality of pieces of image data and obtaining character information based on the first image data by executing the character recognition processing,
wherein character information based on second image data with which the information is associated, out of the received plurality of pieces of image data is obtained by executing processing different from the character recognition processing.

8. The image processing method according to claim 7, the image processing method further comprising:
displaying the generated plurality of pieces of image data and an object on a screen,
wherein, in a case where the displayed object is selected by a user, the information is associated with image data displayed when the object is selected by the user, out of the plurality of pieces of image data.

9. The image processing method according to claim 7, the image processing method further comprising:
determining whether each of the generated plurality of pieces of image data is image data generated by scanning a handwritten document, and
wherein the information is associated with image data determined that image data generated by scanning a handwritten document.

10. The image processing method according to claim 7,
wherein the plurality of pieces of image data are generated by scanning the plurality of documents placed on a glass document platform.

11. The image processing system according to claim 10,
wherein a piece of image data is generated by scanning the plurality of documents placed on the glass document platform and then the plurality of pieces of image data is generated by separating the generated piece of image data.

12. The image processing method according to claim 7, wherein the character information based on the second image data is obtained based on a character string input by executing the processing different from the character recognition processing.

13. An image processing apparatus comprising:
a generation unit configured to generate a plurality of pieces of image data by scanning a plurality of documents;
a controlling unit configured to associate, with image data generated by scanning a handwritten document out of the plurality of pieces of image data, information indicating that the image data is image data generated by scanning a handwritten document; and a transmission unit configured to transmit, to the information processing apparatus, the plurality of pieces of image data generated by the generation unit and the information, wherein the information processing apparatus executes character recognition processing on first image data which the information is not associated, out of the plurality of pieces of image data received from the image processing apparatus and obtains character information based on the first image data by executing the character recognition processing, wherein the information processing apparatus obtains, by executing processing different from the character recognition processing, character information based on second image data which the information is associated, out of the plurality of pieces of image data received by the image processing apparatus.

14. The image processing apparatus according to claim 13, further comprising a display unit;

wherein the display unit displays the plurality of pieces of image data generated by the generation unit and an object on a screen.

15. The image processing apparatus according to claim 13, further comprising a determination unit configured to determine whether each of the plurality of pieces of image data generated by the generation unit is image data generated by scanning the handwritten document, wherein the controlling unit is configured to associate the information with image data determined that image data generated by scanning the handwritten document by the determination unit.

16. The image processing apparatus according to claim 15, further comprising a glass document platform, and wherein the generation unit generates the plurality of pieces of image data by scanning the plurality of documents placed on the glass document platform.

17. The image processing apparatus according to claim 15, wherein the determination unit determines that a document including handwritten character is the handwritten document.

18. The image processing apparatus according to claim 13, wherein the character information based on the second image data is obtained by execution of the processing for receiving input of the character information by an operator.

* * * * *